United States Patent [19]

Frerking, Jr. et al.

[11] 4,379,895

[45] Apr. 12, 1983

[54] ACID-CAPPED POLYESTER RESINS

[75] Inventors: Harlan W. Frerking, Jr., Alliance; Mellis M. Kelley, Akron, both of Ohio

[73] Assignee: The Goodyear Tire & Rubber Company, Akron, Ohio

[21] Appl. No.: 343,619

[22] Filed: Jan. 28, 1982

[51] Int. Cl.$^3$ .................. C08F 283/00; C08G 63/76
[52] U.S. Cl. .................. 525/437; 525/444.5; 528/274; 528/295.3; 528/302
[58] Field of Search .................. 525/437, 444.5; 528/302, 295.3, 274

[56] References Cited

U.S. PATENT DOCUMENTS

| 3,383,343 | 5/1968 | Mohajer et al. | 528/295.3 |
|---|---|---|---|
| 3,530,082 | 9/1970 | O'Gorman et al. | 528/295.3 |
| 3,953,403 | 4/1976 | Fujiyoshi et al. | 528/274 |
| 4,065,439 | 12/1977 | Uno et al. | 528/302 |
| 4,124,570 | 11/1978 | Scheibelhoffer et al. | 525/437 |
| 4,151,220 | 4/1979 | Watanabe et al. | 525/437 |
| 4,155,889 | 5/1979 | Fagerburg et al. | 528/295.3 |
| 4,195,000 | 3/1980 | Charles et al. | 528/295.3 |
| 4,275,189 | 6/1981 | Danick et al. | 525/437 |

Primary Examiner—Lucille M. Phynes
Attorney, Agent, or Firm—Daniel J. Hudak; Bruce Hendricks

[57] ABSTRACT

A polyester resin having a low intrinsic viscosity and suitable for use as a powdered resin is modified by being capped with organic acids. The resins are made from the reaction of diesters with diols with up to 30 mole percent of the diester being replaced with various diacids. The polyester is capped following the condensation reaction stage, but before any finishing stage. The polyester resins have an acid number of from 1 to 100 and allow greater flexibility in the type of acid functionality than previously available.

18 Claims, No Drawings

ACID-CAPPED POLYESTER RESINS

TECHNICAL FIELD

The present invention relates to polyester resins suitable for use as powdered coatings capped with carboxylic acid groups. The resins are generally made from diester-starting compounds and are desirably capped with aromatic acids.

BACKGROUND ART

Heretofore, polyester resins typically were made by the reaction of a diester or a diacid with a diol. If the diacid was utilized, the polyester would have some acid groups in it. Polyesters suitable for powder resin coatings desirably contain a large number of carboxyl end groups to react with epoxide compounds to cure the polyester resin. However, other than the carboxyl end groups which are contained in the polyester upon the preparation thereof, acid end groups have been added through the capping of polymers with anhydrides having two carboxylic acid groups therein, as for example set forth in U.S. Ser. No. 223,972 filed Jan. 12, 1981 and U.S. Ser. No. 223,973, filed Jan. 12, 1981. My previously filed U.S. specification bearing Ser. No. 223,973 relates to the use of anhydride additives and to the use of aromatic acids which serve to increase the activation energy necessary to induce reaction of the copolyester resin with epoxide compounds upon heating. Due to the fast reaction rate of the anhydride with the polyester, large amounts of free acid, that is in excess of 90 percent of the acid charged, remain in the resin. In contrast, the present invention does not utilize any anhydrides before or concurrent with the acid reaction and generally has less than 20 percent of a total amount charged of free acid remaining after the reaction.

U.S. Pat. No. 4,264,751 relates to a copolyester resin having minimal carboxyl terminated ends as well as the method for making it, in which a chain branching agent is generally utilized. Hence, this patent is not pertinent to the present invention.

DISCLOSURE OF INVENTION

It is an object of the present invention to provide a polyester resin capped with an organic carboxylic acid, as well as the process for making the same.

It is another object of the present invention to provide a capped polyester, as above, wherein said polyester is suitable for use as a resin in powdered coatings.

It is yet another object of the present invention to provide a capped polyester, as above, wherein said polyester is made from diesters.

It is yet another object of the present invention to provide a capped polyester, as above, wherein said polyester has an intrinsic viscosity of from about 0.10 to about 0.35 and relatively high acid numbers.

It is yet another object of the present invention to provide a capped polyester, as above, wherein said capping acid is an aliphatic, a dimer acid, an aromatic acid, or an alkyl substituted aromatic acid containing at least two carboxylic groups.

It is yet another object of the present invention to provide a capped polyester, as above, wherein reaction between said acid and said polyester is carried out subsequent to the polycondensation state of the polyester resin, but prior to any powdered-coating finishing stage.

It is yet another object of the present invention to provide a capped polyester, as above, wherein said reaction between said acid and said polyester is carried out at relatively high temperatures.

In general, a process for preparing an acid capped polyester resin, suitable for use in powdered polyester resin, comprises the steps of:

reacting a diester with a diol, said diester selected from the group consisting of an alkyl diester having from 4 to 50 carbon atoms, an alkyl substituted aryl diester having from 10 to 24 carbon atoms, and combinations thereof, said diester optionally containing from about 0.01 percent to about 30 mole percent of a diacid selected from the group consisting of an alkyl dicarboxylic acid having from 2 to 16 carbon atoms, an aryl dicarboxylic acid having from 8 to 16 carbon atoms, an alkyl substituted aryl dicarboxylic acid having from 9 to 16 carbon atoms, a dimer acid having from 34 to 40 carbon atoms, and combinations thereof; said diol having from 2 to 50 carbon atoms; the mole ratio of said diol to said diester and diacid ranging from about 1.20 to about 2.5, and forming the polyester resin having hydroxyl groups thereon;

adding from about 0.01 to 1 mole of an acid for each hydroxyl equivalent in said polyester resin, said acid selected from the group consisting of an alkyl dicarboxylic acid having from 2 to 20 carbon atoms; a dimer acid having from 34 to 40 carbon atoms, an acid of Formula No. 1; an acid of Formula No. 2; and combinations thereof;

FORMULA 1 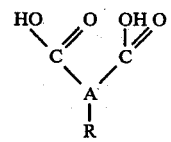

FORMULA 2 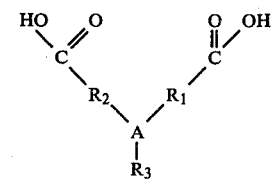

where A is an aromatic compound having from 6 to 18 carbon atoms, where R is an alkyl having from 1 to 18 carbon atoms, or a carboxylic acid group, or hydrogen, where $R_1$ and $R_2$ are an alkyl having from 1 to 18 carbon atoms, and where $R_3$ is an alkyl having from 1 to 18 carbon atoms, or an alkyl carboxylic acid group having from 1 to 18 carbon atoms, or hydrogen, and wherein $R_1$ and $R_2$ can be the same or different;

heating and reacting said acid with said polyester resin at a temperature of from about 180° C. to about 280° C. to acid cap said polyester; and carrying out said reaction until said polyester resin acid number is from about 1 to about 100 and the amount of remaining free acid is less than 20 percent of the added amount.

In general, an acid capped polyester resin suitable for use as a powdered polyester resin, comprising:

an acid capped polyester resin, said acid capped polyester resin having an acid number of from 1 to about 100;

said acid capped polyester resin made by reacting an acid with a polyester having hydroxyl groups thereon;

said acid capped polyester made by adding from about 0.01 to 1 mole of an acid for each hydroxyl equivalent in said polyester resin, said acid selected from the group consisting of an alkyl dicarboxylic acid having from 2 to 20 carbon atoms, a dimer acid having from 34 to 40 carbon atoms, an acid of Formula No. 1, or an acid of Formula No. 2

FORMULA 1

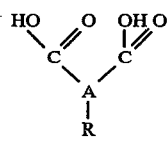

FORMULA 2

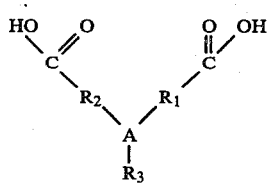

where A is an aromatic compound having from 6 to 18 carbon atoms, where R is an alkyl having from 1 to 18 carbon atoms, or a carboxylic acid group, or hydrogen, wherein $R_1$ and $R_2$ are an alkyl having from 1 to 18 carbon atoms, and where $R_3$ is an alkyl having from 1 to 18 carbon atoms, or an alkyl carboxylic acid group having from 1 to 18 carbon atoms, or hydrogen, wherein $R_1$ and $R_2$ can be the same or different;

said reaction of said capping acid with said polyester having hydroxyl groups being carried out at a temperature of from about 180° C. to about 280° C. and to an extent such that the amount of remaining free acid is less than 20 percent of the added amount;

said polyester resin made by reacting a diester with a diol, said diester selected from the group consisting of an alkyl diester having from 4 to 50 carbon atoms, an alkyl substituted aryl diester having from 10 to 24 carbon atoms, and combinations thereof, said diester optionally containing from about 0.01 percent to about 30 mole percent of a diacid selected from the group consisting of an alkyl dicarboxylic acid having from 2 to 16 carbon atoms, an aryl dicarboxylic acid having from 8 to 16 carbon atoms, an alkyl substituted aryl dicarboxylic acid having from 9 to 16 carbon atoms, a dimer acid having from about 34 to about 40 carbon atoms, and combinations thereof, said diol having from 2 to 50 carbon atoms; the mole ratio of said diol to said diester and diacid ranging from about 1.20 to about 2.5, and forming a polyester having hydroxyl groups thereon.

BEST MODE FOR CARRYING OUT THE INVENTION

Polyester resins or copolyester resins for use in powdered resin coatings are generally mixed with various compounds and ingredients, applied to various substrates such as appliances, as decor to finishes and outdoor furniture, and the like, and then heated to cure the resin. Typically, the compounded powdered coating resin is a combination of a polyester resin, or copolymer thereof, with a curing agent such as an epoxide when the polyester has terminal carboxyl groups. When an epoxide compound is utilized for curing, desirably the polyester resin has a significant carboxyl end group concentration on the termini of the polyester polymers. In addition, many polyester-containing systems cured by non-epoxides in the curing reaction require a certain amount of acid functionality to aid in dispersion of pigments during the finishing stage.

The production of polyester resins conventionally employs four stages, a transesterification stage, a condensation stage, a compounding, and a finishing stage. In the transesterification stage, the organic acid ester is reacted with a diol to produce a very short chain polyester with the elimination of an alcohol or water. In the polycondensation stage, the degree of polymerization is increased by removal of glycols until a suitable value is obtained. In the present invention, the transesterification stage as well as the condensation stage is carried out utilizing conventional catalysts as well as conventional temperatures and pressures, well known to those skilled in the art.

According to the present invention, the condensation stage is carried out until the polyester resin has an intrinsic viscosity of from about 0.05 to about 0.35, preferably from about 0.15 to about 0.25 dl/g. The intrinsic viscosity is determined by utilizing a 60/40 mixture by weight of phenol/tetrachloroethane as a solvent at 30° C. Although generally any conventional dicarboxylic acid can be utilized, the reaction time is generally slow. Hence, diesters are preferred in the present invention. Any alkyl diester having from 4 to 50 carbon atoms and desirably from 6 to about 22 carbon atoms can be utilized. Specific examples include dimethyl adipate, diethyl adipate, and the like. The alkyl substituted aryl diesters are preferred. Such esters contain from 10 to 24 carbon atoms and preferably from about 10 to about 16 carbon atoms. Specific examples of various alkyl substituted aryl diesters include the various isomers of dimethylphthalate including dimethylisophthalate, the various isomers of diethylphthalate, the various isomers of dimethylnaphthalate, the various isomers of diethylnaphthalate, and the like. A preferred diester is dimethylisophthalate, while dimethylterephthalate is highly preferred.

In addition to the diesters, small amounts of dicarboxylic acids can optionally be utilized as a replacement for the diesters. That is, from about 0.01 percent to about 30 mole percent, and preferably from about 0.01 to about 20 mole percent of a diacid may be utilized based upon the total mole content of said diacid and said diester. Conventional dicarboxylic acids are well known to the art and include alkyl dicarboxylic acids having a total of from 2 to 16 carbon atoms, as well as aryl dicarboxylic acids having from 8 to 16 carbon atoms, or an alkyl substituted aryl dicarboxylic acids having a total of from 9 to 16 carbon atoms. Specific examples of alkyl dicarboxylic acids include oxalic acid, malonic acid, adipic acid, and the like. Examples of aromatic acids include terephthalic acid, naphthalic acid, isophthalic acid, and the like. Terephthalic acid and isophthalic acid are preferred. Moreover, dimer acids can also be utilized as described hereinbelow.

The diesters as well as the optional small amount of diacids react in the esterification stage with the diols containing from about 2 to about 50 carbon atoms, and desirably from about 2 to about 15 carbon atoms. The diols may be primary or secondary, as well as straight-chained or branched. Examples of specific diols include neopentyl glycol, hexamethylene glycol, cyclohexane dimethanol, ethylene glycol, propylene glycol, trimethylene glycol, 1,4-butane diol, and the like. Generally, ethylene glycol and hexamethylene glycol are desired, with neopentyl glycol being preferred. The mole ratio of the diol to the diester or the total mole amount of the diester and diacid is from about 1.20 to about 2.5 and preferably from about 1.35 to about 1.80.

The polyester resin is made in a conventional manner including utilizing typical amounts of conventional catalysts, for example various tin catalysts such as butyl tin oxide, or other conventional catalysts used in the preparation of polyester powdered resins.

The endcapping acids which can be utilized are generally an acid containing a plurality of carboxylic acids groups, that is 2 or more carboxylic groups in the compound. The alkyl acids constitute one group, such as the dicarboxylic acids having from 2 to 20 carbon atoms, with 2 to 12 carbon atoms being preferred. Specific examples include oxalic acid, malonic acid, succinic acid, glutaric acid, adipic acid, pimelic acid, suberic acid, azelaic acid, dodecanoic acid, and the like, with adipic acid being preferred.

Another class of acids are the dimer acids generally containing from 34 to 40 carbon atoms and preferably 36 carbon atoms. The dimer acid is itself prepared from an unsaturated fatty acid containing 18 carbon atoms such as linoleic and linolenic acid or the monohydric alcohol esters thereof. The actual preparation and structure of dimerized $C_{18}$ fatty acids are described in J.A.C.S., 66,84 (1944), and U.S. Pat. No. 2,347,562, both of which are hereby fully incorporated by reference. Several different grades of dimer acids are available from commercial sources and these differ from each other, primarily in the amount of monobasic and trimer acid fractions and the degree of unsaturation. It is preferred for purposes of this invention that the dimer acid be substantially free of the monobasic and trimer acid fractions, that is less than 8 percent by weight, and essentially be completely saturated. An example of two suitable dimer acids include Empol 1010 Dimer Acid made by Emery Industries, Inc., typically containing 97 percent dimer acid and 3 percent trimer acid, and essentially no monobasic acids and extremely low saturation; and Empol 1014, also from Emery Industries, and typically containing 95 percent, 4 percent and 1 percent of dimer, trimer, and monobasic, respectively.

The endcapping acid can also be an aromatic acid as represented by Formulas 1 or 2.

FORMULA 1

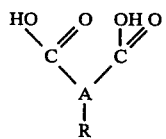

FORMULA 2

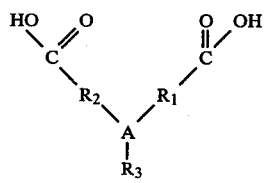

where A is an aromatic radical having from 6 to 18 carbon atoms such as a phenyl group, a naphthyl group, or the like. R is an alkyl containing from 1 to 18 carbon atoms, with 1 to 10 carbon atoms being preferred. R can also be a carboxylic acid group or hydrogen. $R_1$ and $R_2$ can be the same or different and can be an alkyl having from 1 to 18 carbon atoms, with 1 to 12 carbon atoms being preferred. $R_3$ can be an alkyl having from 1 to 18 carbon atoms with from 1 to 12 carbon atoms being preferred. $R_3$ can also be an alkyl having a carboxylic acid group thereof containing from 1 to 18 carbon atoms, with from 1 to 12 carbon atoms being preferred. $R_3$ can also be hydrogen. Representative samples of various aromatic acids which may be utilized include naphthalic acid; 1,4-[dicarboxyethyl]-benzene; 1,3-[dicarboxyethyl]-5-octylbenzene; and the like. Terephthalic acid is preferred with isophthalic acid being highly preferred.

Any of the above acids, or mixtures thereof, are added to the polyester resin to cap the polymer. Only the above-described type acids are added, no other type of non-acid or acid forming groups are added, for example, anhydrides, etc. That is, anhydrides, etc., and the like, for the purposes of this invention, are not considered to be an acid. Capping is achieved by the acid displacing the hydroxyl group in the polyester resin. This reaction takes place during the compounding stage, that is after the condensation stage but before any finishing stage. The amount of acid utilized is from about 0.01 to about 1 mole for each equivalent of hydroxyl groups contained in the polymer with from about 0.05 moles to 1 mole of acid being preferred. Depending upon the desired end use of the resin, generally either most of the hydroxyl or a small amount thereof will be removed and capped with acid. The polymers are capped by reaction with the acids until a desired acid number is obtained. Generally, a suitable acid number is from 1 to about 100, with from about 1 to 60 being desired and from about 10 to about 60 being preferred. Wherever a pigmented type powdered resin is desired, the acid number is preferably from about 5 to about 15, whereas whenever the powdered polyester resin is to be used with an epoxy curing agent, the acid number is preferably from about 30 to about 60. Exceedingly high amounts (greater than 1.5 mole per equivalent hydroxyl) of the capping acids are not utilized in that they would interfere with the crosslinking of the powdered coating resins upon compounding thereof. Generally, the melt viscosity of the capped polyester resins is below 200 poise at 200° C., desirably from about 10 to about 100 poise, and preferably from about 20 to about 60 poise.

It is to be understood that only an acid as described hereinabove is added to cap the resin, and that no other acid-containing compounds, for example anhydrides, are utilized at the acid addition step. Thus, the desired type of capping group can be added to the polymer chain. Moreover, the majority of the acid is reacted with the polymer so that less than 20 percent and preferably less than 10 percent of the acid charge remains as free acid. If any other acid containing compounds are desired to be utilized such as anhydrides, they are added only after the acid addition step or during the later stages of the acid reaction step. Thus, the present invention permits capping of polyesters with other than 1-, 2-, type aromatic compounds which are inherent with anhydrides.

In order to cap the polyester resins with an a acid, the reaction must be carried out at high temperatures. That is, generally from about 180° C. to about 280° C., with a range of from about 240° to about 260° C. being preferred. The reaction is generally carried out under atmospheric pressure, although vacuums or higher than atmospheric pressures can be utilized. An inert gas is preferred such as nitrogen. The reaction time will vary depending upon type of acid, amount thereof, and temperature. Generally, from about three fourths of one hour to about three hours is required.

Once the polyester resin has been capped with the acid, it is ready for the conventional finishing stage in which various additives are added to make the final powdered coating. However, during the preparation of the polyester resin, various conventional additives can be utilized. For example, it is desirable at times to use internal chain branching agents during the preparation of the polyester resin so that leveling of the final powdered polyester resin is improved. Examples of chain branching agents include compounds having the functionality of three or more which are incorporated within the chain of the polyester prepolymer to retain a branch reactive site. Examples include trimellitic anhydride, pentaerythritol, glycerol, trimethylol propane, triethylol propane, and the like. The chain branching agent is generally added and reacted during the esterification stage and is utilized in a concentration of from about 0.5 to 25 mole percent comparative to the concentration of the dicarboxylic compound, preferably in the concentration of about 3 to 5 percent. Other compounds which may be utilized include any multihydroxyl/carboxylic acid/ester combination such as 3,4-dihydroxyl butanoic acid.

The acid capped polyester resin made according to the process of the present invention can be compounded utilizing various additives. For example, various conventional curing agents such as triglycidal isocyanurate, low molecular weight glycidal, multifunctional epoxy curing agents, and the like. If sufficient hydroxyl ends remain after capping, traditional curing agents for hydroxyl terminated resins such as caprolactam blocked isophorone diisocyanate may also be used. Additionally, various known catalysts, flow control agents, pigments, mineral pigments, and the like can be utilized in suitable amounts to effect a desired end result of the powdered polyester coating. Examples of general classes of catalysts include amine containing compounds, such as amides, imides, imidazoles, quaternary ammonium salts, metal salts of acidic and fatty acids, tin and zinc compounds, and the like. Flow control agents, which generally act as leveling agents and assist in the release of trapped gases during the cure reaction, include benzoil, Modaflow II from Monsanto, silicone, cellulose acetate butyrate, and the like. Naturally, any conventional pigment can be utilized with perhaps rutile titanium dioxide being the most widely used. Pigments of various other colors, and the like, can be utilized along with non-chalking agents, etc. Fillers are occasionally used to reduce the cost of a powder-coating system. Fillers commonly used include talc, barytes, clay, wood flour, silica, and the like.

In accordance with conventional technology, once the powdered resins are compounded and made into a finishing powder, they can be applied to an object in any conventional manner. A typical application includes electrostatic spraying upon an object which is then baked in an oven. The heating causes the curing agent and catalyst to crosslink and form a protective polyester coating upon the object.

The acid terminated polyesters of the present invention can be used to produce powder coatings having good thin film appearance, good exterior weathering, and the like. Typical applications include coatings of appliances, metal desks and chairs, restaurant furniture supports, farm equipment, irrigation pipe and fixtures, aluminum extrusions, transformers, and the like.

The invention will be better understood by reference to the following examples.

EXAMPLE I 55.98 g of neopentyl glycol, 0.83 g of trimethylol propane, 59.98 g of dimethylterephthalate, and a small amount of dibutyl tin oxide catalyst were charged into a tube reactor and heated at 230° C. until methanol ceased to be evolved. Neopentyl glycol was removed under vacuum (~5 mmHg) at 230° C. until the viscosity was visually estimated to be about 0.16 IV. The vessel was brought to atmospheric pressure with $N_2$ and rapidly heated to 250° C. 13.2 g of isophthalic acid was then added, allowed to react for 60 minutes, and the polymer removed from the reaction.

The polymer had the following properties:

| Intrinsic viscosity | 0.132 |
|---|---|
| Acid number | 58 mg KOH/g |
| Hydroxyl number | 15 mg KOH/g |
| Tg | 57° C. |

EXAMPLE II

The reaction was run in the same manner as Example I, except that only 6.57 g of isophthalic acid was added and allowed to react for 45 minutes. The polymer had the following properties:

| Intrinsic viscosity | .087 |
|---|---|
| Acid number | 6. mg KOH/g |
| Hydroxyl number | 111 mg KOH/g |
| Tg | 39° C. |

EXAMPLE III 55.98 g of neopentyl glycol, 0.83 g of trimethylol propane, 47.18 g of dimethylterephthalate, 12.80 g of dimethylisophthalate, and a small amount of dibutyl tin oxide catalyst were charged into a tube reactor and heated at 230° C. until methanol ceased to be evolved. Neopentyl glycol was removed under reduced pressure (~5 mmHg) at 230° C. until the viscosity was visually estimated to be about 0.16 IV. The vessel was brought to atmospheric pressure with $N_2$ and rapidly heated to 250° C. 5.78 g of adipic acid was then added, allowed to react for 90 minutes, and the polymer removed from the reactor. The polymer had the following properties:

| Intrinsic viscosity | 0.155 |
|---|---|
| Acid number | 32 mg KOH/g |
| Hydroxyl number | 10 mg KOH/g |
| Tg | 59° C. |

EXAMPLE IV

The reaction was run in the same manner as Example III, except that 6.57 g of terephthalic acid was added instead of the adipic acid and allowed to react for 60 minutes. The resulting polymer had the following properties:

| Intrinsic viscosity | .092 |
|---|---|
| Acid number | 5 mg KOH/g |
| Hydroxyl number | 99 mg KOH/g |
| Tg | 47° C. |

While in accordance with the patent statutes, the preferred embodiment and best mode has been set forth, the invention is not to be limited thereto, the scope of the invention being limited by the scope of the attached claims.

What is claimed is:

1. A process for preparing an acid capped polyester resin, suitable for use in powdered polyester resins, comprising the steps of:

reacting a diester with a diol, said diester selected from the group consisting of an alkyl diester having from 4 to 50 carbon atoms, an alkyl substituted aryl diester having from 10 to 24 carbon atoms, and combinations thereof, said diester optionally containing from about 0.01 percent to about 30 mole percent of a diacid selected from the group consisting of an alkyl dicarboxylic acid having from 2 to 16 carbon atoms, an aryl dicarboxylic acid having from 8 to 16 carbon atoms, an alkyl substituted aryl dicarboxylic acid having from 9 to 16 carbon atoms, a dimer acid having from 34 to 40 carbon atoms, and combinations thereof; said diol having from 2 to 50 carbon atoms; the mole ratio of said diol to said diester and diacid ranging from about 1.20 to about 2.5, and forming the polyester resin having hydroxyl groups thereon;

adding from about 0.01 to 1 mole of an acid for each hydroxyl equivalent in said polyester resin, said acid selected from the group consisting of an alkyl dicarboxylic acid having from 2 to 20 carbon atoms; a dimer acid having from 34 to 40 carbon atoms, an acid of Formula No. 1; an acid of Formula No. 2; and combinations thereof;

FORMULA 1                    FORMULA 2

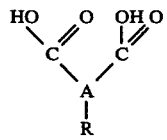 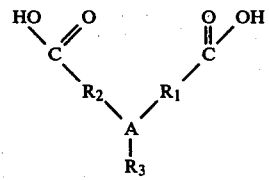

where A is an aromatic compound having from 6 to 18 carbon atoms, where R is an alkyl having from 1 to 18 carbon atoms, or a carboxylic acid group, or hydrogen, where $R_1$ and $R_2$ are an alkyl having from 1 to 18 carbon atoms, and where $R_3$ is an alkyl having from 1 to 18 carbon atoms, or an alkyl carboxylic acid group having from 1 to 18 carbon atoms, or hydrogen, and wherein $R_1$ and $R_2$ can be the same or different;

heating and reacting said acid with said polyester resin at a temperature of from about 180° C. to about 280° C. to acid cap said polyester; and carrying out said reaction until said polyester resin acid number is from about 1 to about 100 and the amount of remaining free acid is less than 20 percent of the added amount.

2. A process according to claim 1, including carrying out said acid capping reaction after the condensation stage and before any finishing stage.

3. A process according to claim 2, wherein said resin has an intrinsic viscosity of from about 0.05 to about 0.35.

4. A process according to claim 3, wherein said alkyl diester has from about 6 to about 22 carbon atoms and said aryl diester has from about 10 to about 16 carbon atoms, and wherein said diol has from about 2 to about 15 carbon atoms; wherein said alkyl dicarboxylic capping acid has from 1 to 12 carbon atoms; wherein said dimer acid has 36 carbon atoms; wherein R is from 1 to 10 carbon atoms or is a carboxylic acid group, or a hydrogen, wherein $R_1$ and $R_2$ have from 1 to 12 carbon atoms, and where $R_3$ has from 1 to 12 carbon atoms or is an alkyl carboxylic acid group containing from 1 to 12 carbon atoms.

5. A process according to claim 4, wherein said reaction temperature ranges from about 240° to about 260° C., wherein the acid number is from about 1 to about 60, and wherein the amount of acid utilized ranges from about 0.05 to about 1.0 moles for each hydroxyl equivalent in said polymer.

6. A process according to claim 5, wherein the mole ratio of said diol to said diester and said optional acid ranges from about 1.35 to about 1.80.

7. A process according to claim 6, wherein said diester is selected from the group consisting of dimethylterephthalate, dimethylisophthalate, and combinations thereof, wherein said optional acid utilized is selected from the group consisting of terephthalic acid, and isophthalic acid, wherein said diol is selected from the group consisting of neopentyl glycol, ethylene glycol, hexamethylene glycol, and combinations thereof.

8. A process according to claim 7, wherein the intrinsic viscosity ranges from about 0.15 to about 0.25, and wherein the amount of said optional dicarboxylic acid utilized is from about 0.05 to about 20 mole percent.

9. A process according to claims 1, 3, 5, 6, 7, or 8, wherein said capping acid is selected from the group consisting of terephthalic acid, isophthalic acid, adipic acid, and combinations thereof.

10. An acid capped polyester resin suitable for use as a powdered polyester resin, comprising:

an acid capped polyester resin, said acid capped polyester resin having an acid number of from about 1 to about 100;

said acid capped polyester resin made by reacting an acid with a polyester having hydroxyl groups thereon;

said acid capped polyester made by adding from about 0.01 to 1 mole of an acid for each hydroxyl equivalent in said polyester resin, said acid selected from the group consisting of an alkyl dicarboxylic acid having from 2 to 20 carbon atoms, a dimer acid having from 34 to 40 carbon atoms, an acid of Formula No. 1, or an acid of Formula No. 2

FORMULA 1                    FORMULA 2

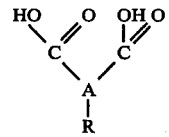 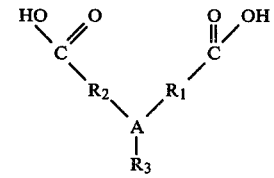

where A is an aromatic compound having from 6 to 18 carbon atoms, where R is an alkyl having from 1 to 18 carbon atoms, or a carboxylic acid group, or hydrogen, wherein $R_1$ and $R_2$ are an alkyl having from 1 to 18 carbon atoms, and where $R_3$ is an alkyl having from 1 to 18 carbon atoms, or an alkyl carboxylic acid group having from 1 to 18 carbon atoms, or hydrogen, wherein $R_1$ and $R_2$ can be the same or different;

said reaction of said capping acid with said polyester having hydroxyl groups being carried out at a temperature of from about 180° C. to about 280° C. and to an extent such that the amount of remaining free acid is less than 20 percent of the added amount;

said polyester resin made by reacting a diester with a diol, said diester selected from the group consisting of an alkyl diester having from 4 to 50 carbon atoms, an alkyl substituted aryl diester having from 10 to 24 carbon atoms, and combinations thereof, said diester optionally containing from about 0.01 percent to about 30 mole percent of a diacid selected from the group consisting of an alkyl dicarboxylic acid having from 2 to 16 carbon atoms, an aryl dicarboxylic acid having from 8 to 16 carbon atoms, an alkyl substituted aryl dicarboxylic acid having from 9 to 16 carbon atoms, a dimer acid having from about 34 to about 40 carbon atoms, and combinations thereof, said diol having from 2 to 50 carbon atoms; the mole ratio of said diol to said diester and diacid ranging from about 1.20 to about 2.5, and forming a polyester having hydroxyl groups thereon.

11. An acid capped polyester resin according to claim 10, wherein said acid number is from about 1 to about 60, and the intrinsic viscosity of said polyester resin is from about 0.05 to about 0.35.

12. An acid capped polyester resin according to claim 11, wherein R has from 1 to 10 carbon atoms or is a carboxylic acid group, or a hydrogen, wherein $R_1$ and $R_2$ have from 1 to 12 carbon atoms, and where $R_3$ has from 1 to 12 carbon atoms or is an alkyl carboxylic acid group containing from 1 to 12 carbon atoms.

13. An acid capped polyester resin according to claim 12, wherein said reaction temperature is from about 240° C. to about 260° C.

14. An acid capped polyester resin according to claim 13, wherein the intrinsic viscosity is from about 0.15 to about 0.25.

15. An acid capped polyester resin according to claim 10, 11, 12, 13, or 14, wherein said optional acid is selected from the group consisting of isophthalic acid, terephthalic acid, adipic acid, and combinations thereof.

16. An acid capped polyester resin according to claim 15, wherein said alkyl diester has from about 6 to about 22 carbon atoms and said aryl diester has from about 10 to about 16 carbon atoms, and wherein said diol has from about 2 to about 15 carbon atoms.

17. An acid capped polyester resin according to claim 16, wherein the amount of acid utilized ranges from about 0.05 mole to about 1 mole, and wherein the mole ratio of diol to diester is from about 1.35 to about 1.80.

18. An acid capped polyester resin according to claim 17, wherein said optional acid is selected from the group consisting of terephthalic acid, isophthalic acid, and combinations thereof.

* * * * *